US 6,934,914 B1

(12) United States Patent
Vittal et al.

(10) Patent No.: US 6,934,914 B1
(45) Date of Patent: Aug. 23, 2005

(54) SYSTEM TO OPTIMIZE RECEIVED POWER IN AN OPTICAL NETWORK

(75) Inventors: Chiradeep Vittal, Santa Clara, CA (US); Gopesh Garg, San Jose, CA (US)

(73) Assignee: Ciena Corporation, Linthicum, MD (US)

(*) Notice: Subject to any disclaimer, the term of this patent is extended or adjusted under 35 U.S.C. 154(b) by 384 days.

(21) Appl. No.: 10/027,916

(22) Filed: Dec. 20, 2001

(51) Int. Cl.[7] .............................................. G06F 15/00
(52) U.S. Cl. ..................................... 715/763; 715/734
(58) Field of Search ................................ 345/763, 765, 345/767; 398/5, 38, 25; 715/763, 765, 734, 715/771

(56) References Cited

U.S. PATENT DOCUMENTS 6,590,644 B1 * 7/2003 Coin et al. .................. 356/218

6,701,087 B2 * 3/2004 Beine et al. .................. 398/38

* cited by examiner

Primary Examiner—Cao (Kevin) Nguyen
(74) Attorney, Agent, or Firm—Michael R. Cammarata; Shailendra Bhumralkar; Daniel Tagliaferri

(57) ABSTRACT

System to optimize received power at an input to a component in a network element that forms part of an optical network. The system includes a graphical user interface (GUI) that guides an installer to allow optimal setting for a variable optical attenuator (VOA) to be determined, thereby using the VOA to optimize the received power at the component. Power parameters are determined for each card in a signal path from the VOA to the input, and as part of the GUI, the system provides a display of calculated and received power to the user, thereby allowing the user to determine the optimal power setting.

28 Claims, 5 Drawing Sheets

SYSTEM TO OPTIMIZE RECEIVED POWER IN AN OPTICAL NETWORK

FIELD OF THE INVENTION

The present invention relates generally to a system for controlling the power levels of signals in an optical network, and more particularly, to a system to optimize received power at an optical receiver in a network element.

BACKGROUND OF THE INVENTION

Optical networks are becoming widely used for distributing both high and low speed data over varying distances. Typically, an optical network is comprised of a number of network elements (NE) that are connected to each other in a variety of configurations so as to form a unified communication network. The communication network may extend over a small area, such as a company wide network, or may cover large distances, such as in regional or nationwide networks. Typically, the NE's allow network clients to input data for transmission over the network and to receive data transmitted over the network from other locations. Thus, data may be added or dropped from the network at NE locations as the data flows from point to point throughout the network.

Typically, a network element includes one or more wavelength converters that convert optical signals from one wavelength to another. The wavelength converters are used as part of input or output tributaries associated with a network element. For example, an input tributary allows a network user to input signals at an NE for transmission over the network, and an output tributary allows a network user to receive signals at an NE that have been received from the network.

FIG. 1 shows a typical network element 100 that receives signals transmitted over a communication network and includes an output tributary that produces an output signal to a local user. The network element couples to the communication network as shown at 102. The input signal from the network may be received by a line receiver 104. The output of the line receiver 104 is coupled to a demulitplexer stage 106 that filters the received input signal to produce a demultiplexed signal 108 that is intended to be input to a transceiver circuit 110. The transceiver circuit may convert the received signal 108 to a different optical wavelength or an electrical signal for output as output signal 112.

It is very important to control the optical power input to the transceiver circuit 110 so that the transceiver operates optimally. If the power is too high, then the transceiver hardware can be damaged, and/or errors may creep into the signals. If the power is too low, then again, the signals may not remain error-free. The network designer calculates the optimal receive power range for the transceiver input and the network installer (technician) needs to ensure that the optical received power at the transceiver is indeed in that range. For some traffic types, the optimal range is extremely narrow, and so an accurate transceiver input power setting is required.

Usually, the network is designed such that the received power is never too low. In many cases, the design ensures that the power received at the transceiver is very high. In this case, typical systems use a "pad" or a fixed attenuator 114 just before the transceiver circuit to control the power level seen at the input of the transceiver. The attenuator 114 operates to reduce the power level of the signal input to the transceiver by a fixed amount.

However, the process of installing pads is a labor-intensive procedure that involves the physical presence of personnel at each site. The value of the pads may have to change during network upgrades, even if the upgrades occur at a different site in the optical network. There may be dozens of pads that need to be adjusted. During a network switching event, power changes to the signal 108 may occur, with the result that the pad value may not be accurate enough or may require additional adjustment to obtained the desired power level at the transceiver 110 input. Furthermore, the problems associated with input power levels variations exist for many other components in a network element, not just to transceiver circuits.

Therefore, it would be desirable to have a way to optimize received power at an optical receiver (or other component) in a network element without having to install pads that are labor intensive to maintain and may not provide the accuracy required.

SUMMARY OF THE INVENTION

The present invention includes a system to optimize received power at an input to a component in a network element that forms part of an optical network. For example, the system operates to optimize received power at an input to a transceiver used in a network element. However, the invention is not limited to setting the input power levels to only transceiver components, and may be adapted for use to set the input power levels to virtually any component or circuit card in a network element.

The system includes a graphical user interface (GUI) that guides an operator to determine optimal settings for a variable optical attenuator (VOA), thereby using the VOA to optimize the received power at a transceiver. The system simplifies network installation and network upgrades by not requiring a technician or operator to be physically present at every network element site to optimize the power levels. The system includes additional features, such as operator guides and warnings, to achieve the optimal transceiver input power settings, which further speeds up installation and turn-up. By providing warnings and restrictions on attenuation values, the GUI prevents damage to expensive network components.

In one embodiment of the invention, a system is provided for adjusting signal power levels at an input to a selected circuit card in a network element that forms part of an optical network. The network element includes one or more circuit cards that define a signal path to the selected circuit card. The system includes a variable optical attenuator (VOA) located in the signal path to the selected circuit card. The VOA includes logic to receive an input signal and produce an attenuated output signal that is transmitted over the signal path, and wherein the VOA also includes control logic to receive control parameters used to set a VOA attenuation factor.

The system also includes a power level detector coupled to the signal path at the input of the selected circuit card to detect a power level value, and wherein the power level detector includes logic to output the power level value. Power parameters associated with the one or more circuit cards that define the signal path are obtained by the system. The power parameters describe loss characteristics of the signal path through each of the one or more circuit cards. The system further includes a user display for displaying information to a user and a user input device for receiving input from a user.

Lastly, the system includes a processing system coupled to the display, the input device, the power detector, the VOA, and the one or more circuit cards. The processing system includes logic to obtain the power parameters associated with the one or more circuit cards, logic to receive the power level value output from the power detector, logic to display calculated power parameters and actual power parameters associated with the signal path, logic to receive a user input from the user input device, wherein the user input indicates a selected power level, and logic to form the control parameters that are transmitted to the VOA to adjust the VOA attenuation factor, wherein the control parameters are based on the selected power level, and wherein when the VOA attenuation factor is adjusted, a selected input power occurs at the input of the selected circuit card.

In another embodiment of the invention, a method is provided for adjusting signal power levels at an input to a selected circuit card in a network element that forms part of an optical network. The network element includes one or more circuit cards that define a signal path to the selected circuit card, and the signal path includes at least one VOA. The method comprises the steps of computing calculated power parameters for the signal path, obtaining measured power parameters at the input to the selected circuit card, displaying the calculated and measured power parameters on a user display, receiving a user input, and adjusting an attenuation factor of the at least one VOA. The adjustment is based on the received user input, and when the attenuation factor is adjusted, a selected input power is provided at the input to the selected circuit card.

In another embodiment of the invention, a system is provided for adjusting signal power levels at an input to a selected circuit card in a network element that forms part of an optical network. The network element includes one or more circuit cards that define a signal path to the selected circuit card. The system includes a variable optical attenuator (VOA) located in the signal path to the selected circuit card, the VOA includes logic to receive an input signal and produce an attenuated output signal that is transmitted over the signal path, and wherein the VOA also includes control logic to receive control parameters used to set a VOA attenuation factor. The system also includes a power level detector coupled to the signal path at the input of the selected circuit card to detect a power level value and a user interface. Lastly, the system includes a processing system coupled to the VOA, the power level detector, and the user interface. The processing system comprises logic to determine a calculated loss for the signal path and output the calculated loss and the power level value to a user via the user interface, and logic to create the control parameters that are transmitted to the VOA to adjust the VOA attenuation factor based on a user input received via the user interface, wherein the power level at the input to the selected circuit card is adjusted.

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION OF THE INVENTION

The present invention includes a system to optimize input power at an optical receiver in a network element (NE) that forms part of an optical network. In one embodiment, the system includes a graphical user interface to allow a network administrator or technician to determine and set optimal power levels at the input to a transceiver circuit card. The improved system results in highly accurate power settings that protect the cards from damage and provides cost savings, since it is not necessary to maintain and adjust individual pads. However, the invention is not limited to setting the power levels at only optical receiver circuit cards, and can be used to set input power levels at virtually any type of network card. Thus, various embodiments of the system included in the present invention are discussed in detail in the following text.

EXEMPLARY EMBODIMENT

In one embodiment included in the present invention, a system is provided that includes a graphical user interface (GUI) that guides an installer to select optimal power settings in a network element that result in desired power levels at the input of one or more transceiver circuit cards. The GUI includes the following features:

1. Mechanism to set the attenuation value of a VOA.
2. An indication of the current VOA attenuation setting.
3. An indication of a possible optimal setting, given the network configuration and accounting for the real component losses of every circuit pack in a signal path from the VOA to the receiver input.
4. The current received optical power at all receivers affected by a particular VOA.
5. A color-coded warning that warns about possible receiver overload conditions below certain VOA attenuation setting. The warning can be extended to a preventative measure by disallowing the setting of attenuation values that result in receiver damage.
6. Circuit protection features, for example, the user is asked to confirm twice whether the requested attenuation is really the attenuation he wishes to set.

Figure 1:
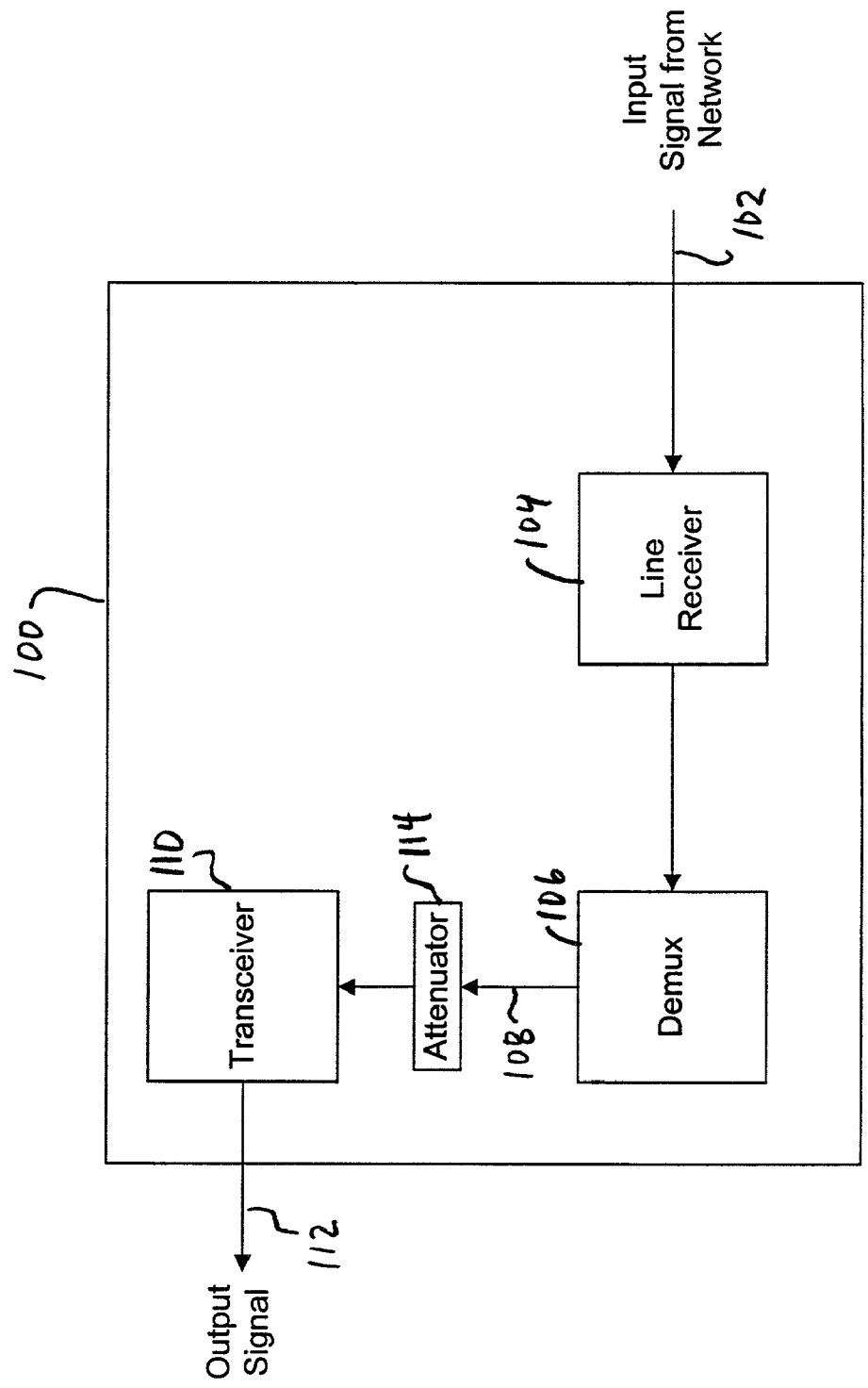
FIG. 1 shows a typical network element for use in an optical network.
Figure 2:
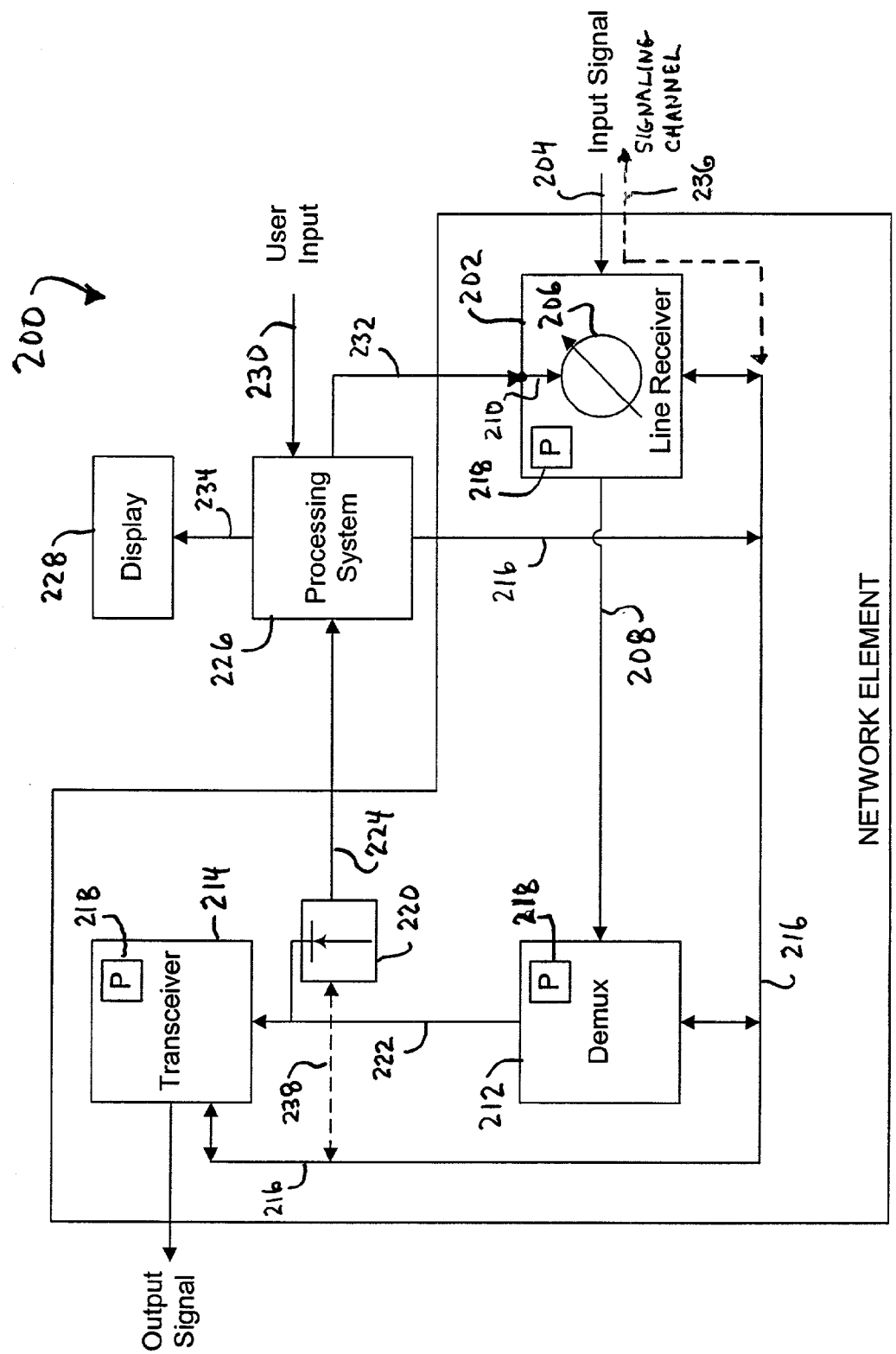
FIG. 2 shows a network element and includes one embodiment of a system for setting transceiver input power constructed in accordance with the present invention.

FIG. 2 shows a network element and includes one embodiment of a system 200 for setting receiver input power constructed in accordance with the present invention. The network element includes a line receiver 202 that receives an input signal 204 from the network. The line receiver 202 includes a VOA 206 that is operable to attenuate the input signal 204 to produce and attenuated signal 208. The VOA may be any suitable type of VOA used to attenuate optical signals. The VOA includes an input 210 to receive control parameters that can be used to set an attenuation factor of the VOA. In one embodiment, the VOA is replaced with a variable optical amplifier that operates to provide either attenuation or gain to a received signal. For example, a gain setting less than one provides attenuation. Thus, a wide range of optical devices are suitable for use as the VOA 206.

The attenuated signal 208 output from the VOA is routed through a demux circuit 212, and thereafter input to a transceiver circuit 214.

Although a basic set of circuit cards are shown in the network element, it will be understood that additional cards could be incorporated in a network element as shown, such as additional filters to separate working and protection traffic, or additional demultiplexers to further filter the traffic. Additionally, although the VOA 206 is located at the line receiver 202 in this example, the VOA 206 may be located at any other circuit card in the signal path in the network element. For example, the VOA 206 may be located in the signal path at the demux circuit 212.

A local network 216 is coupled to circuit cards in the network element so that the cards may communicate with each other, or so that the cards may communication with another network entity. Each of the cards includes logic and/or software to communication using the local network 216. Furthermore, each of the cards includes their own stored parameters, shown at 218 that provide information about the loss characteristics associated with signal paths through each card. For example, the demux 212 includes parameters 218 that define the loss characteristics experienced by the attenuated signal 208 as it flows through the demux card on its way to the transceiver card 214. The parameters 218, located at each card, provide loss characteristic for each signal path through their respective card, and are determined when the card is manufactured. In another embodiment, the parameters are determined and stored in the cards after manufacture, for example, during testing or installation. Furthermore, the parameters may be updated at any time.

A power detector 220 is coupled to the input of the transceiver circuit card 214, so that it is possible to measure the signal power of a signal input to the transceiver circuit card. For example, the signal power of the signal 222 can be measured. The power detector may be a PIN detector or any other suitable type of power detector. The detector 220 includes a detector output 224 that can be used to output detected power values.

A processing system 226 is included in the present embodiment. The processing system is coupled to a user display 228 via line 234 so that the processing system can display various types of information to a user. The processing system also includes logic to form a user input that may receive input from a user as shown at 230. The system 226 also includes logic to communicate via the local network 216. Thus, the processing system can communicate with the circuit cards included in the network element.

The processing system includes logic to receive the detector output 224 so that power values determined by the detector 220 can be communicated to the processing system 226. The processing system also includes logic to form a VOA control output 232 that transmits control parameters to the VOA control input 210. For example, the control parameters can be used to control an attenuation factor of the VOA.

Figure 3:
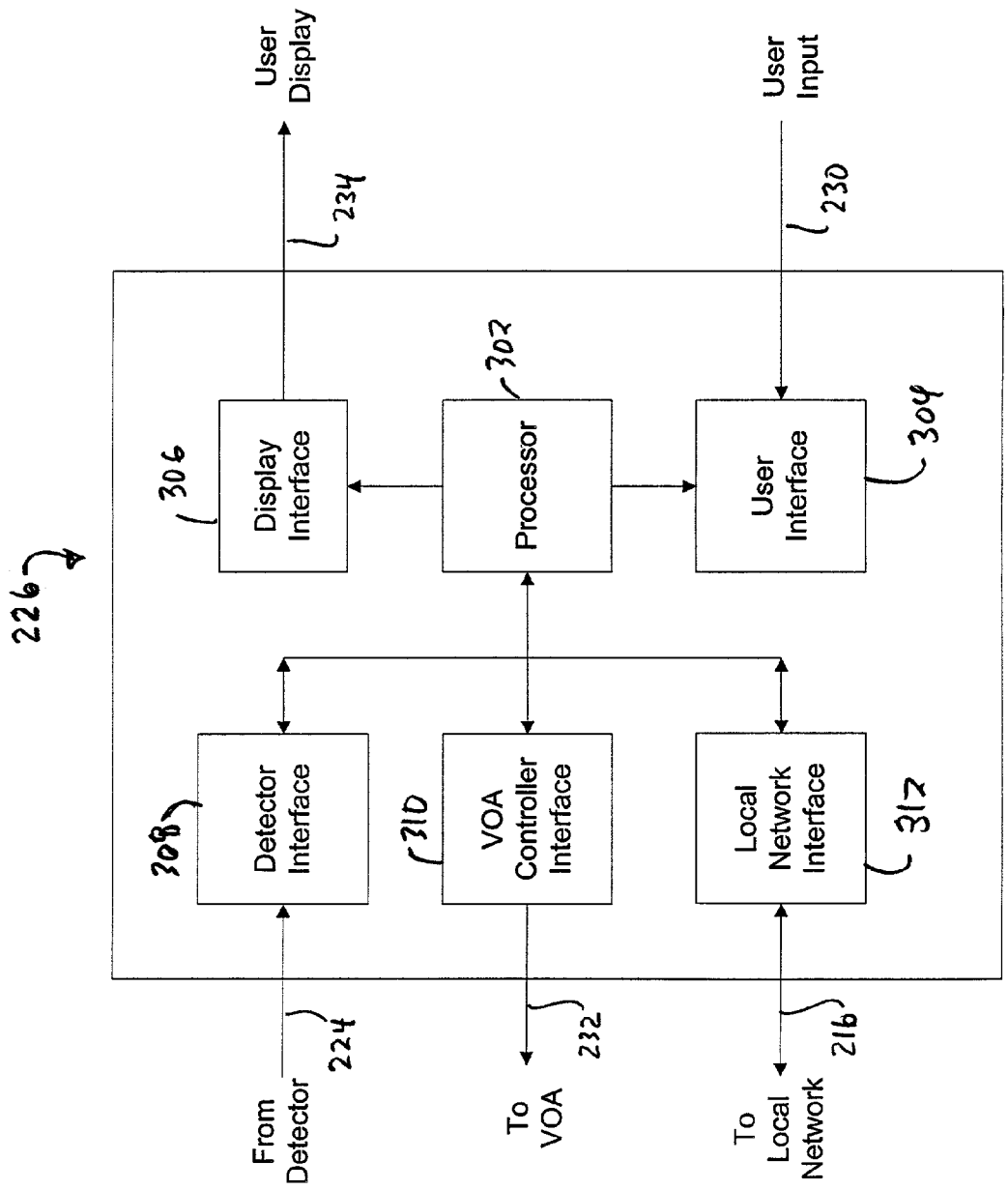
FIG. 3 shows one embodiment of a processing system constructed in accordance with the present invention.

FIG. 3 shows one embodiment of a processing system 226 constructed in accordance with the present invention. The processing system includes a processor 302 that is coupled to a user interface 304, display interface 306, detector interface 308, VOA controller interface 310 and a local network interface 312.

The processor 302 may comprise virtually any type of processing hardware and/or software and may be formed of a CPU, gate array, programmable logic, signal processing logic, micro-controller or any other type of processing hardware or software. Furthermore, the processor 302 may include a memory for program or data storage and may execute one or more instructions stored in the memory to perform the functions described herein.

The detector interface 308 operates to receive the detector output 224 from the detector 220 and provide the detected power level values to the processor 302. The VOA controller interface 310 operates to receive control parameters from the processor 302 and transmit the control parameters to the VOA 206 via the control output 232. The local network interface 312 operates to allow the processor 302 to communicate via the local network 216 with the internal circuit cards of the network element. Thus, it is possible that the parameters 218 stored at each of the circuit cards be transmitted to the processor 302 via the local network 216.

The user interface 304 operates to provide a way for the user input 230 to be received by the processor 302. For example, the user input may be provided by a mouse or a keyboard or any other type of user input device. The display interface 306 operates to receive display information from the processor 302 and to provide the display information at a display output 234 to the user display 228. The user display 228 may be any type of display device, for example, a CRT, LCD or any other type of display device, and the display interface 306 includes logic to display the display information on the selected display device.

Figure 4:
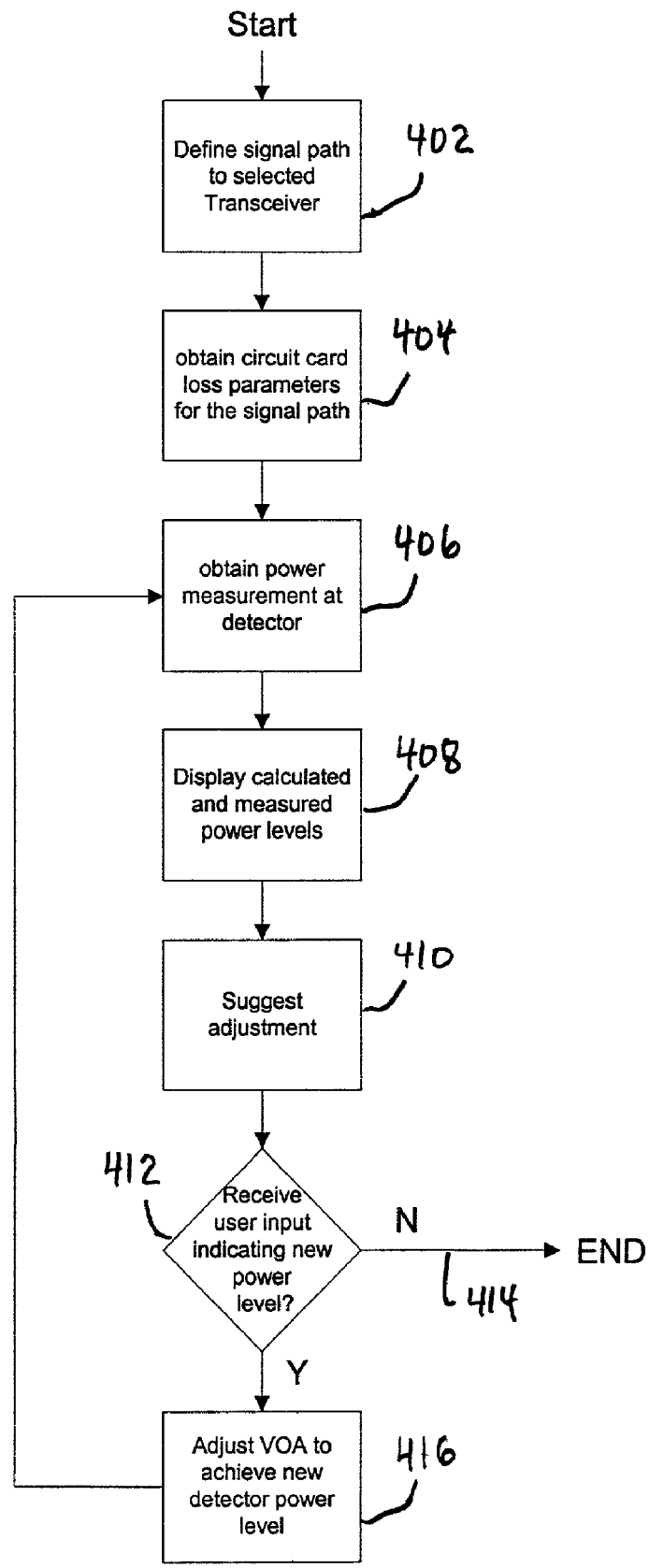
FIG. 4 shows a flow graph for adjusting signal power levels at a transceiver circuit in accordance with the present invention.

FIG. 4 shows a flow graph 400 for adjusting signal power levels at an input to a component in a network element in accordance with one embodiment included in the present invention. For the purposes of clarity, the flow graph 400 is described with reference to adjusting the signal power levels at an input of a transceiver in a network element. However, the described method can be easily adapted to adjust the signal power levels input to virtually any component in a network element.

At block 402, a signal path in a network element is defined for a signal that is to be input to a transceiver circuit card. For clarity purposes, it will be assumed that the signal path is the signal path shown in FIG. 2 extending from the input 204 to the transceiver card 214. This signal path includes the VOA 206. However, any signal path in the network element can be defined, as long as there is a controllable VOA in the signal path.

At block 404, the loss parameters for circuit cards in the signal path are obtained. In one embodiment, the loss parameters for all cards in the signal path are obtained. In another embodiment, only the loss parameters for circuit cards between the VOA and the transceiver card are obtained. For example, the processing system 226 communicates, via the local network 216, with all circuit cards in the signal path to obtain the loss parameters stored at each respective card.

At block 406, a power level value at the input of the transceiver card is obtained. For example, the detector 220 measures the power level at the input to the transceiver card 214 and transmits this information to the processing system 226 via path 224. At this point, the processing system 226 has acquired the stored parameters for each card in the signal path and the actual measured power level at the input to the transceiver card 214.

At block 408, calculated and measured power level values are displayed to a user via a display device. For example, the processing system determines the calculated power level values by processing the stored power parameters for each circuit card in the signal path. For example, combining the loss associated with each circuit card in the signal path results in a predicted power level value for the signal power at the input of the transceiver card. It will be assumed that the processing system can obtain the received input power at the input of the line receiver 202 via the local bus. For example, typical line receivers are able to measure their received power and make this measure value available. Additionally, the actual power level measured by the detector 220 is also available to the processing system for display.

At block 410, as part of displaying the power level information, the processing system also displays information that suggests power level changes to be made. For example, the processing system suggests a change to the VOA 206 attenuation factor, which ultimately adjusts the signal power of the signal that is seen at the input of the transceiver card.

At block 412, the user may provide an input to adjust the VOA attenuation setting to adjust the signal power at the transceiver card input. If the user decides not to adjust the VOA settings, then the adjustment is complete and the method ends as shown at 414. If the user does enter changes to the attenuation setting of the VOA, then the method proceeds to block 416.

At block 416, the user input is used to change the attenuation settings of the VOA, thereby adjusting the power level of the signal input to the transceiver card. For example, the user inputs information to the processing system with the user input device. However, protection features may be implemented at this point to either warn the user about potentially dangerous power level settings, (i.e., via an alarm or colored screen display), or to request special confirmation from the user before implementing a new setting. In one embodiment, selected power level settings may be completely disallowed.

The processing system uses the information from the user to create VOA control parameters to transmit to the VOA via the VOA controller interface 310. The control parameters are used by the VOA to set an attenuation factor. After updating the VOA settings, the method proceeds to block 406 where a new power detection reading is obtained and displayed to the user with the calculated power values. After seeing the results of the VOA adjustment, the user then has an opportunity to adjust the VOA settings again, or accept the current power levels.

Thus, it is possible to accurately adjust the signal power level at the input of the transceiver card using the system included in the present invention. It is also possible, within the scope of the invention, to perform the above-described method at a location that is remote to the network element being adjusted. For example, the network elements may communicate with each other via a signaling channel that is incorporated into the transmissions from network element to network element. For example, the signaling channel may be incorporated into the data received at input 204 as shown at 236, and the power detector may be coupled to the local network 216 as shown at 238. At each network element, information on the local network may be placed on the signaling channel. Thus, it is possible that the detector 220 output values and the local card parameters 218 at one network element, are transmitted via the signaling channel 236, to another network element or network entity, such as a central network processor. It is also possible to transmit information to the network element via the signaling channel from the other network entity. For example, VOA control parameters can be transmitted via the signaling channel to a specific VOA in a specific network element. Therefore, using the signaling channel 236, it is possible to remotely operate the processing system 226 and the display 228, and still operate the system as described herein. In such a case, the signaling channel 236 is used to carry information between the network element and the remotely located processing system. It will be understood that the signaling information may be carried in-band, interspersed with payload traffic, or out-of-band on a dedicated signaling channel line. Thus, it is not necessary for a network operator or technician to be physically present at each network element to perform one or more embodiments included in the present invention.

Figure 5:
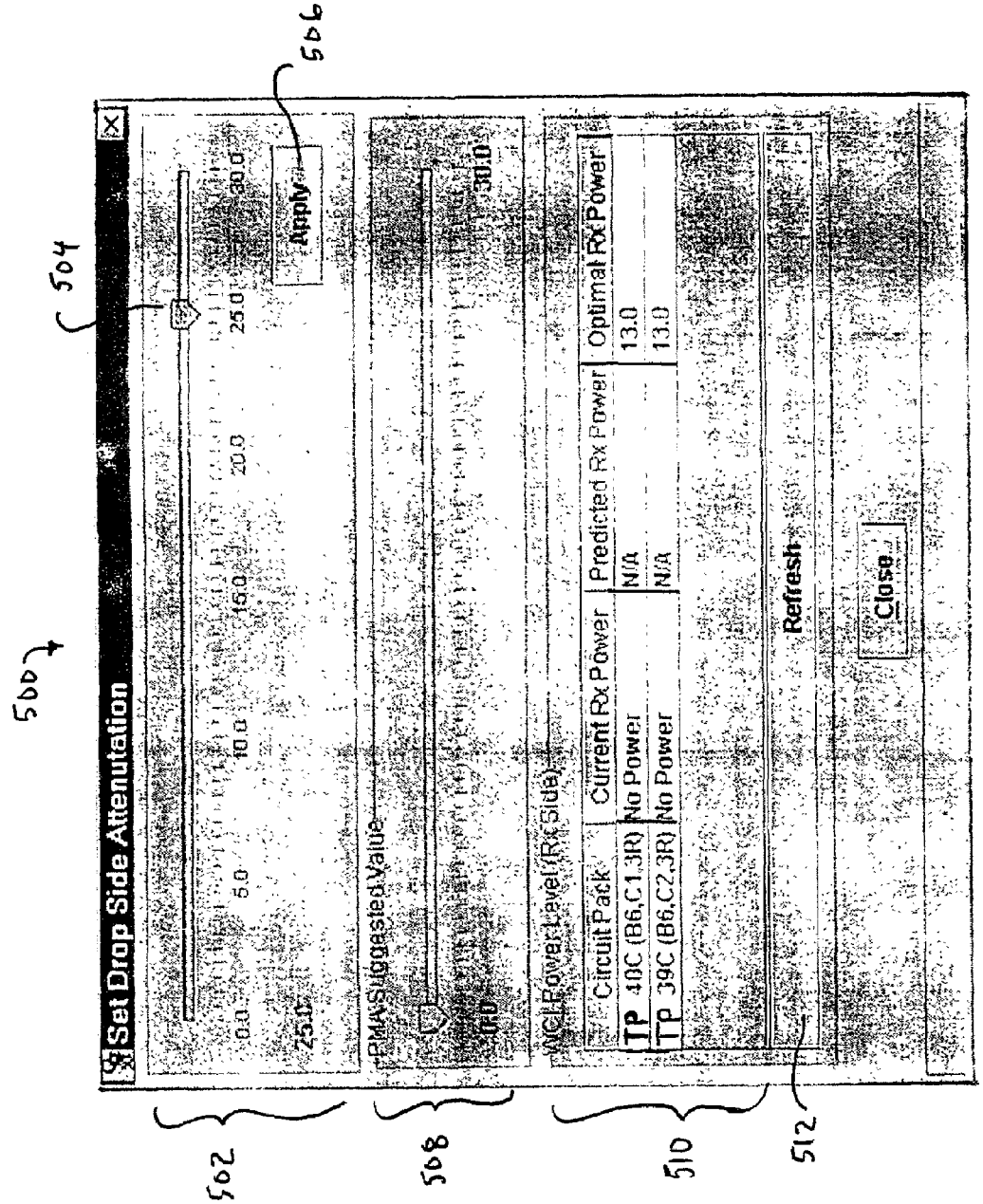
FIG. 5 shows an exemplary display screen for adjusting signal power levels at an input to a transceiver circuit in accordance with the present invention.

FIG. 5 shows an exemplary display screen 500 for adjusting signal power levels at an input to a transceiver circuit in accordance with the present invention. The display screen includes a user input area 502. To input information, the user uses a cursor or pointing device (mouse) to slide a selector 504 to a specific value indicator. The user then moves the cursor over an "apply" button 506 and clicks a user input button, such as a mouse button, to apply the selected power value to the input of the transceiver card.

Also included in the display screen 500 is a suggested value area 508 that suggests to the user a value to use for the VOA setting. The suggested values are computed by the processing system 226 based the calculated power values of the signal path and the actual power values at the transceiver input.

An input power status area 510 is included that identifies each circuit pack where the input power is being monitored and controlled. For example, the status area 510 in FIG. 5 shows that the input to two transceiver circuit packs (TP) are being monitored. For each of the transceiver circuit packs a display of a current input power value, a predicted input power value and an optimal input power value are provided. At any time the user can move the mouse pointer or cursor to a refresh bar 512, and click a mouse button to obtain a refreshed display containing the most up to date power information.

Although the exemplary display 500 is discussed herein, there are many types and arrangements of display screens suitable for use in one or more embodiments of the present invention. Thus, rearrangement, additions or deletions of the display areas, as well as changes to the user input techniques are well within the scope of the present invention.

Furthermore, it is possible within the scope of the invention to extend the operation of the apparatus and/or methods to set the power levels at multiple transceiver inputs in a network element. For example, multiple signal paths containing associated VOAs may be controlled in accordance with the present invention. In such a case, the exemplary display screen 500 may be modified to show power information for multiple TP inputs. For example, in FIG. 5 the input power status area 510 shows power information for two transceiver cards that are affected by the adjustment of the single VOA 206. Thus, not only is it possible to control power at multiple transceiver inputs, but it is also possible to prioritized transceivers when making the determination of VOA settings. For example, a user can highlight (or otherwise select) the TP that he/she wishes to adjust, see a suggested value for the highlighted card in area 508, and then apply an adjustment to the VOA via the input area 502 to adjust the input power at the selected transceiver card. When the display is refreshed, the user will see the effects of the adjustment on all of the transceiver cards that may be affected by the adjustment.

Therefore, the system included in the present invention provides an interactive user interface to allow a user to view existing power information related to signal power received at an input to one or more transceiver circuit cards, and to adjust the power levels by making adjustments to the display using a user input device. The inputted adjustments are then used to create VOA control parameters that are transmitted to one or more VOAs to set the power levels at the selected transceiver input.

Furthermore, one or more embodiments included in the present invention can be used to set input power levels to any circuit card in a network element. Thus, the invention is not limited to setting the power levels at only transceiver circuit cards.

In another embodiment included in the present invention, the power parameters for each circuit card in a selected signal path in a network element are stored in a central location. For example, the parameters are stored in a central processor that communicates with each network element via a network signaling channel. The central processor communicates with selected VOAs and power detectors via the signaling channel to provide a display to an operator to allow a power level to be set at a particular component in a selected network element. The stored power parameters are maintained in a central database where parameters for each component of every network element are preserved. Thus, an operator at a central location may adjust power levels at any network element by remotely adjusting a selected VOA in an associated signal path.

The present invention includes a system to optimize input power at a transceiver circuit in an optical network. The system includes a flexible graphical user interface that allows a user to easily adjust the input power levels to any component in a network element. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. System for adjusting signal power levels at an input to a selected component in a network element that forms part of an optical network, wherein the network element includes one or more circuit cards that define a signal path to the selected component, the system comprising:
   a variable optical attenuator (VOA) located in the signal path to the selected component, the VOA includes logic to receive an input signal and produce an attenuated output signal that is transmitted over the signal path, and wherein the VOA also includes control logic to receive control parameters used to set a VOA attenuation factor;
   a power level detector coupled to the signal path at the input of the selected component to detect a power level value, and wherein the power level detector includes logic to output the power level value;
   power parameters associated with the one or more circuit cards that define the signal path, the power parameters describe loss characteristics of the signal path through each of the one or more circuit cards;
   a user display for displaying information to a user;
   a user input device for receiving input from a user; and
   a processing system coupled to the display, the input device, the power detector, the VOA, and the one or more circuit cards, the processing system includes:
   logic to obtain the power parameters associated with the one or more circuit cards;
   logic to receive the power level value output from the power detector;
   logic to display on the user display calculated power parameters and actual power parameters associated with the signal path;
   logic to receive a user input from the user input device, wherein the user input indicates a selected power level; and
   logic to form the control parameters that are transmitted to the VOA to adjust the VOA attenuation factor, wherein the control parameters are based on the selected power level, and wherein when the VOA attenuation factor is adjusted, a selected input power occurs at the input of the selected component.

2. The system of claim 1, wherein the selected component is an optical receiver card.

3. The system of claim 1, wherein the power parameters are associated with each of the one or more circuit cards and are stored at that respective circuit card.

4. The system of claim 1, further comprising a local network that is coupled to the one or more circuit cards and the processing system.

5. The system of claim 4, wherein the local network is a local Ethernet network.

6. The system of claim 1, wherein the processing system is coupled directly to the power detector, the VOA, and the one or more circuit cards.

7. The system of claim 1, wherein the processing system is coupled to the power detector, the VOA, and the one or more circuit cards via a network signaling channel.

8. A method for adjusting signal power levels at an input to a selected component in a network element that forms part of an optical network, wherein the network element includes one or more circuit cards that define a signal path to the selected component, and the signal path includes at least one VOA, the method comprising steps of:
   computing calculated power parameters for the signal path;
   obtaining measured power parameters at the input to the selected component;
   displaying the calculated and measured power parameters on a user display;
   receiving a user input; and
   adjusting an attenuation factor of the at least one VOA, wherein the adjustment is based on the received user input, and wherein when the attenuation factor is adjusted, a selected input power is provided at the input to the selected circuit card.

9. The method of claim 8, wherein the selected component is an optical receiver card.

10. The method of claim 8, wherein the step of computing calculated power parameters includes a step of obtaining loss parameters associated with the one or more circuit cards.

11. The method of claim 10, wherein the step of computing calculated power parameters includes a step of obtaining the loss parameters associated with the one or more circuit cards via a local network that is coupled to the circuit cards.

12. The method of claim 11, wherein the step of computing calculated power parameters includes a step of obtaining the loss parameters associated with the one or more circuit cards via a local network that is coupled to the circuit cards, wherein the local network is an Ethernet network.

13. The method of claim 8, wherein the step of obtaining the measured power parameters is a step of obtaining the measured power parameters at the input to the selected component by coupling directly to the network element.

14. The method of claim 8, wherein the step of obtaining the measured power parameters is a step of obtaining the measured power parameters at the input to the selected component via a network signaling channel.

15. The method of claim 8, further comprising a step of repeating the steps of obtaining and displaying after the step of adjusting.

16. The method of claim 8, wherein the step of obtaining is a step of obtaining measured power parameters at the input to a plurality of circuit cards including the selected component.

17. The method of claim 16, wherein the step of adjusting is a step of adjusting an attenuation factor of the at least one VOA, wherein the adjustment is based on the received user input, and wherein when the attenuation factor is adjusted, a selected input power is provided at the input to one of the plurality of circuit cards.

18. System for adjusting signal power levels at an input to a selected component in a network element that forms part of an optical network, wherein the network element includes one or more circuit cards that define a signal path to the selected component, the system comprising:
   a variable optical attenuator (VOA) located in the signal path to the selected component, the VOA includes logic to receive an input signal and produce an attenuated output signal that is transmitted over the signal path, and wherein the VOA also includes control logic to receive control parameters used to set a VOA attenuation factor;
   a power level detector coupled to the signal path at the input of the selected component to detect a power level value;
   a user interface; and
   a processing system coupled to the VOA, the power level detector, and the user interface, wherein the processing system comprises:
      logic to determine a calculated loss for the signal path and output the calculated loss and the power level value to a user via the user interface; and
      logic to create the control parameters that are transmitted to the VOA to adjust the VOA attenuation factor based on a user input received via the user interface, wherein the power level at the input to the selected component is adjusted.

19. The system of claim 18 further comprising power parameters associated with the one or more circuit cards that define the signal path, the power parameters describe loss characteristics of the signal path through each of the one or more circuit cards.

20. The system of claim 19, wherein the user interface comprises:
   a user display for displaying information to a user; and
   a user input device for receiving input from a user.

21. The system of claim 20, wherein the logic to determine the calculated loss comprises:
   logic to obtain the power parameters associated with the one or more circuit cards to determine the calculated loss associated with the signal path;
   logic to receive the power level value output from the power detector; and
   logic to display on the user display the calculated loss and the power level value.

22. The system of claim 21, wherein the selected component is an optical receiver card.

23. The system of claim 21, wherein the power parameters are associated with each of the one or more circuit cards and are stored at that respective circuit card.

24. The system of claim 21, further comprising a local network that is coupled to the one or more circuit cards and the processing system and wherein the processing system obtains the power parameters via the local network.

25. The system of claim 24, wherein the local network is a local Ethernet network.

26. The system of claim 24, wherein the processing system is coupled directly to the local network.

27. The system of claim 24, wherein the processing system is at a remote location and is coupled to the local network via a network signaling channel.

28. The system of claim 27, wherein the power parameters are stored at the remote location.

* * * * *